Sept. 9, 1969 S. DUFF 3,465,722
BATTERY CAGES
Filed Nov. 9, 1966 4 Sheets-Sheet 1
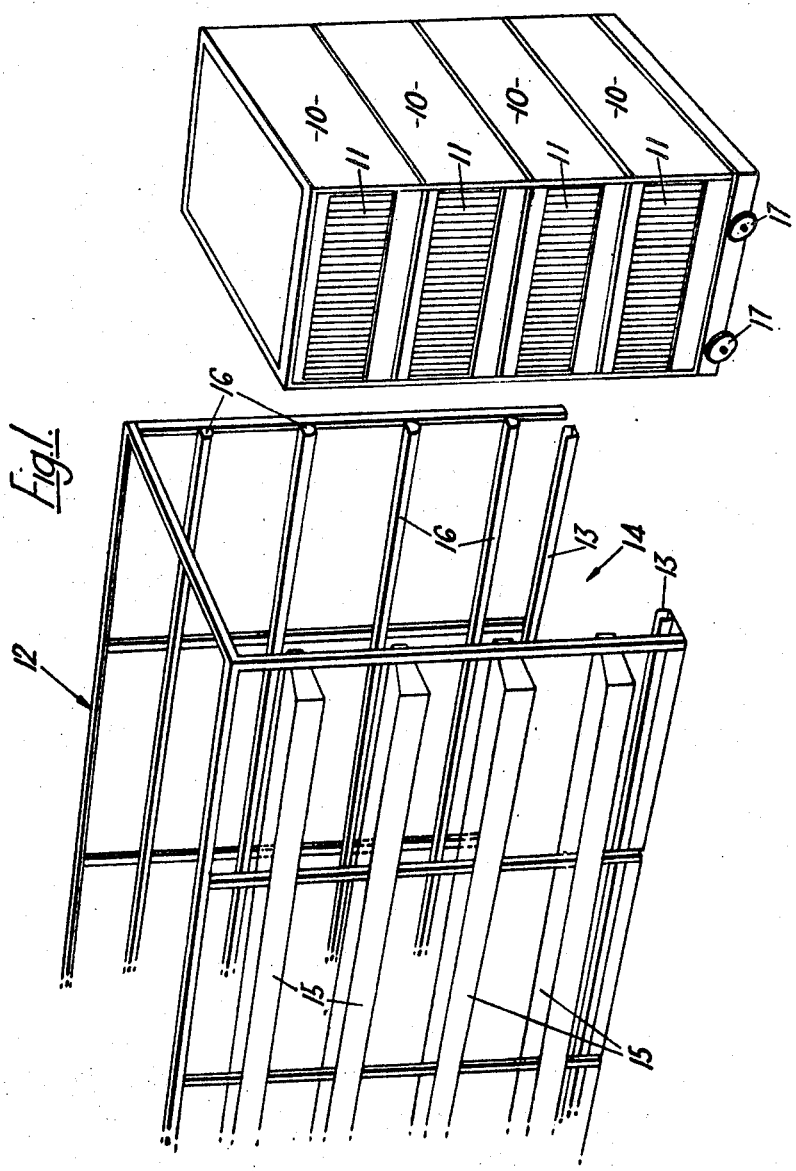
Inventor
SAMUEL DUFF
By Mason, Fenwick & Lawrence
Attorneys

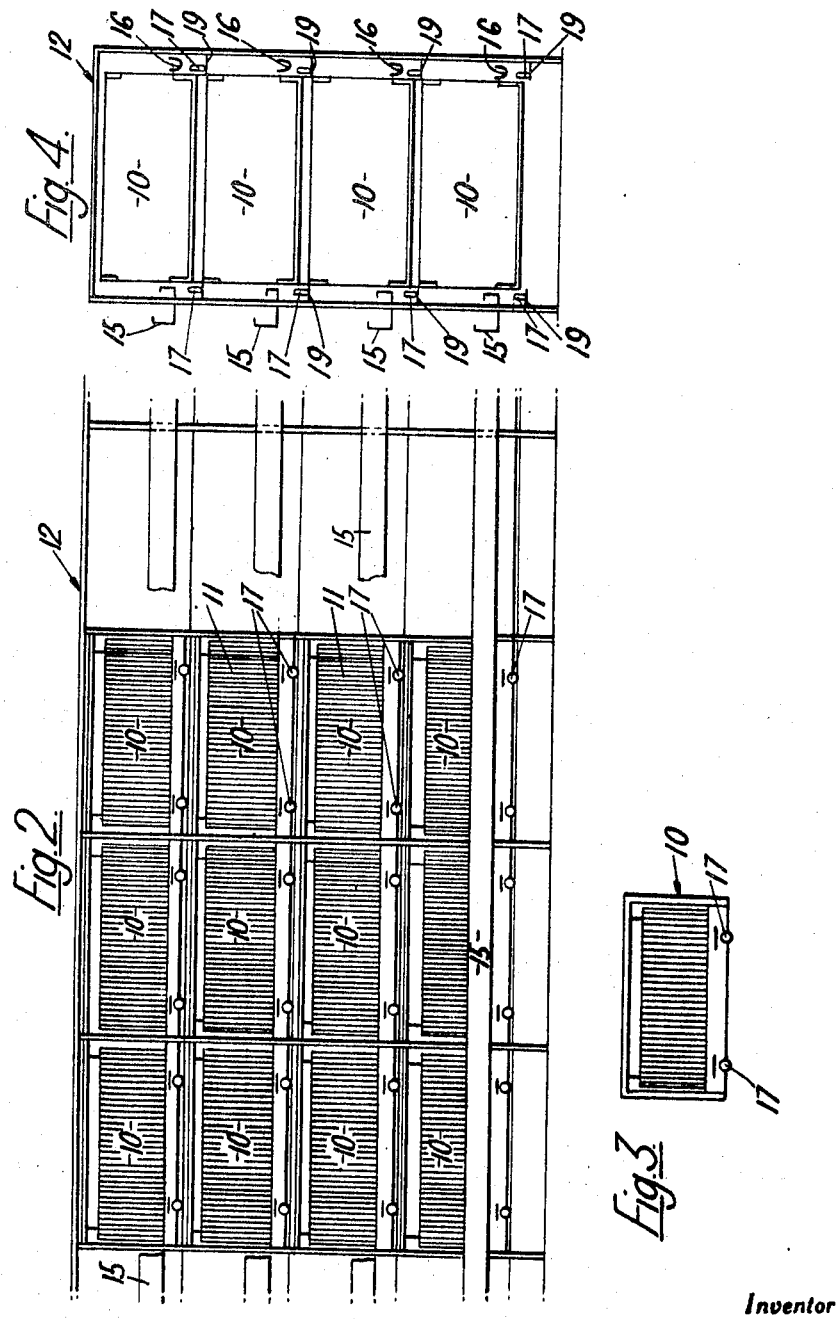

Sept. 9, 1969   S. DUFF   3,465,722
BATTERY CAGES
Filed Nov. 9, 1966   4 Sheets-Sheet 3
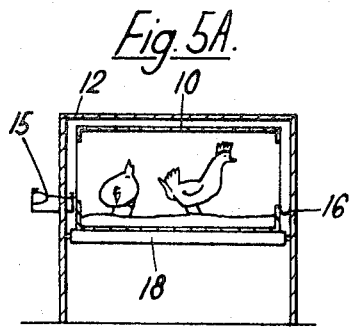
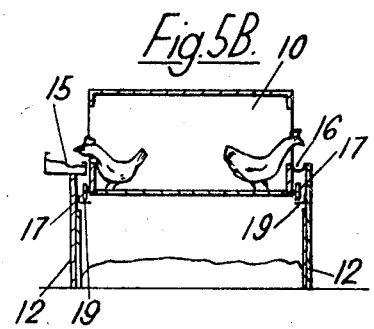
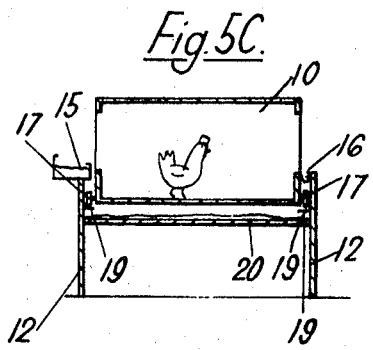
Inventor
SAMUEL DUFF
By Mason, Fenwick & Lawrence
Attorneys

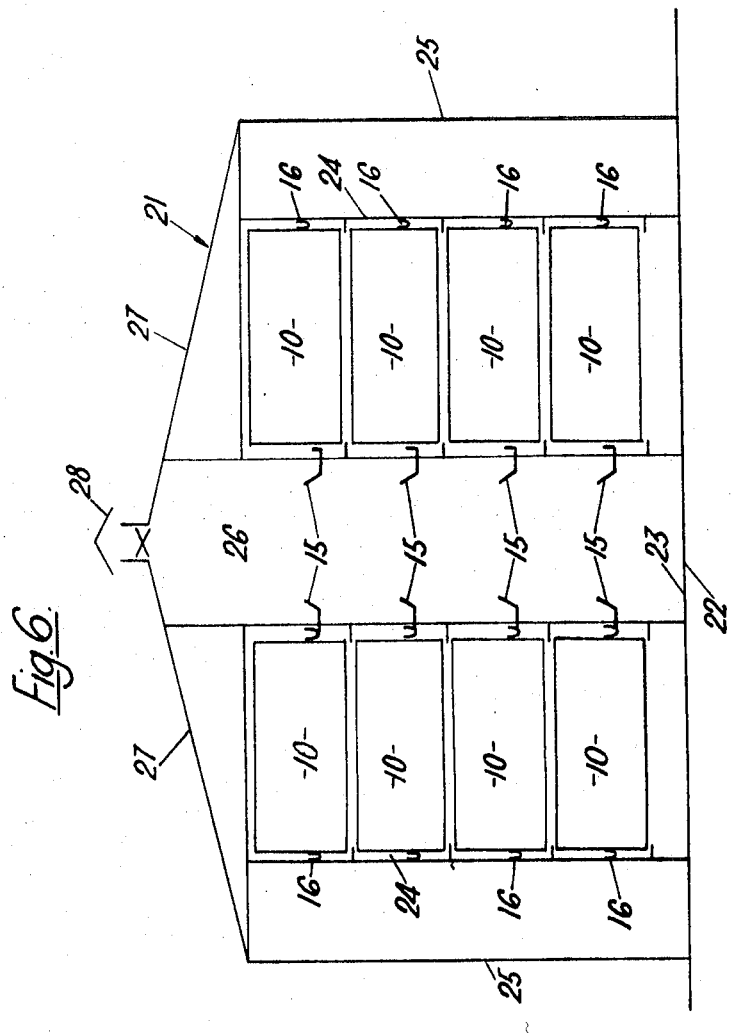

United States Patent Office 3,465,722
Patented Sept. 9, 1969

3,465,722
BATTERY CAGES
Samuel Duff, "Glen-Airley," Killaghy, Donaghadee,
County Down, Northern Ireland
Filed Nov. 9, 1966, Ser. No. 593,205
Claims priority, application Great Britain, Nov. 9, 1965,
47,344/65
Int. Cl. A01k 31/06, 31/18
U.S. Cl. 119—18                                     7 Claims

ABSTRACT OF THE DISCLOSURE

A poultry cage system having a series of upright parallel transversely spaced frames between which horizontally aligned cages are positionable within the space between the frames so that poultry within the cages can feed from troughs attached to the exterior sides of the frame. The cages may be stacked and wheeled on the ground or they may be individually mounted in the space between the two frames so that successive adjacent cages can be inserted between the frames by horizontal movement inwardly from a position adjacent the ends of the frames.

---

This invention relates to battery cages for rearing of domestic fowls or game birds (hereinafter and in the claims referred to as poultry).

According to the present invention, a battery cage includes a plurality of transportable compartments, a longitudinal track to receive and support a plurality of units, and a frame, having a series of upright members to which drinking and feeding troughs are attached, provided adjacent to the track such that occupants of the compartments can feed and drink from the troughs.

Preferably, the frame forms an alleyway and has on at least one level a longitudinal track adapted to receive and support a plurality of compartments thereon.

Preferably also, the compartments are received in the alleyway in stacked relation, one or more series of stacked compartments being located therein in longitudinally spaced relation.

Alternatively, the compartments may be received in the alleyway in longitudinally spaced rows, one or more vertically spaced rows being located therein.

A conveyor may be provided on the track to transport and support the compartments along its length or part thereof.

Alternatively, each compartment may be provided with rollers or the like to enable each compartment to move easily along the track.

Each battery cage may be provided with an impermeable skin supported by the frame, said skin being to house the cage to protect the cage from atmospheric elements.

Further according to the present invention, a building includes a base, at least two battery cages located in parallel on the base and spaced apart to define a passage-way, and a skin comprising a side wall supported by the outer side of each frame, an end wall supported by the end side of each frame, and a roof formed by a roof member located above and secured to each frame.

Preferably the roof members are spaced apart to define a gap and a ridge piece secured over the gap to allow air to enter or exhaust through the gap.

Embodiments of the present invention will now be described, by way of example, with reference to the accompanying drawings, in which:

FIG. 1 is a perspective view of a battery cage with a plurality of compartments withdrawn from a frame, according to one embodiment of the present invention, FIG. 2 is a side elevation of a battery cage according to a second embodiment of the present invention, FIG. 3 is a side elevation of a compartment unit used in the battery cage shown in FIG. 2, FIG. 4 is an end elevation of the battery cage shown in FIG. 2.

FIGS. 5A, 5B and 5C are end elevations of a row of compartments according to further embodiments of the present invention, and FIG. 6 is an end elevation of a building according to the present invention.

In the first embodiment a battery cage includes twenty compartments 10, only four of which are shown in FIG. 1. Each compartment 10 has a grille 11 on two opposed sides. A frame 12 which includes upright supports spaced longitudinally apart has a track to receive and support the units 10. The track in this embodiment is a pair of transversely spaced U-channels 13 located adjacent to the base of the frame 12.

The frame 12 has two side structures and cross bars at the top and forms an alleyway 14 to receive five sets of quadruple-decked or stacked compartments 10, with the grilles 11 adjacent to the opposed longitudinal sides of the frame 12.

Four feeding troughs 15 are provided along one side of the frame at four different levels, and four drinking troughs 16 are provided along the opposed side at four similar levels such that the occupants of each compartment can easily feed and drink from the troughs 15, 16 once the units 10 are in position in the alleyway 14.

Wheels 17 are located in the base of the lowermost unit 10 of the decked units.

In further embodiments of the invention now to be described, like parts are denoted by like numerals.

In a second embodiment, FIGS. 2, 3 and 4, the frame 12 has tracks on four levels, each track being a pair of transversely spaced rails 19, and each pair of rails 19 is capable of receiving a row of five longitudinally spaced compartments 10, the grilles 11 being positioned as in the first embodiment.

Each compartment 10 thus has a set of four wheels 17 positioned on its base, one adjacent each corner to engage each pair of rails 19.

In a third embodiment, each pair of rails 19 is replaced by a horizontal series of frictionless rollers 18 and the compartments 10 therefore do not require to have wheels 17.

There are several ways in which the poultry droppings can be collected. In FIG. 5A, the base of the unit 10 is a solid flooring, and the droppings collect and remain on the floor. In FIG. 5B, the base of the unit 10 is either slatted with wood or is a wire floor and the droppings mainly pass through the floor to lie and collect on the base of the frame 12 which in this embodiment is used to support only one row of units 10. Wheels 17 are provided on the compartment 10 to run along rails 19. In FIG. 5C, the base of the unit 10 is as in FIG. 5B, and a removable board 20 is located underneath the row of compartments to collect the droppings.

Also the removal of droppings may be achieved by any known mechanical system.

In FIG. 6 which shows a building 21, two battery cages are arranged in parallel on a base 22 of concrete or the like. The cages are spaced apart to define a passageway 23. In this embodiment, the outer supports 24 of each frame are extended to support a wall 25, and the inner supports 26 of each frame are extended upwardly to support a pitched roof member 27. End walls (not shown) are provided. The roof members are spaced apart and a ridge piece 28 is located over a gap defined by the spaced apart roof members 27.

A fan may be provided adjacent to the gap to assist in exhausting foul air from the building.

The ridge piece 28 may be replaced by a duct system.

A conveyor belt may be used as the means of moving the compartments along the alleyway, and if so each compartment rests, during the period when it is stationary, on the track.

A conveyor belt system or a series of frictionless rollers may be used to transport the units 10 to and from the battery cage.

Any number of tracks may be provided in the frame 12 suitable either to receive single, double, treble or four decked units 10, and also a plurality of frames equidistant to each other may be provided in a restricted area.

In use, about twenty-five birds are placed in each compartment unit, and the units 10 are introduced into the alleyway 14 in the frame 12. Any of the known mechanical feeding and watering systems for use with battery cages may be used to fill the troughs 15 and 16.

After the rearing or fattening period is completed, the units 10 are removed from each alleyway and transported to, for instance, to a milling station.

Once the poultry have been removed, the compartments 10 are emptied of foreign matter, for example droppings, and are washed, ready for re-use.

I claim:

1. A battery cage unit comprising in combination two upright parallel frames spaced transversely apart to define an alleyway, a plurality of horizontal troughs mounted in vertically spaced relation on the outside of each frame, a plurality of horizontal vertically spaced cage supports on the inner sides of said frames, a plurality of cages movably mounted on said supports, said cage supports constituting means for horizontally moving the cages from end to end in said alleyway so that the cages are adjacent one side of each frame in alignment with the troughs of that frame so that the occupants can use the adjacent troughs, said troughs being fillable from the exterior side of their respective frames.

2. A battery cage unit as claimed in claim 1, in which the cages are stacked.

3. A battery cage unit as claimed in claim 1, in which two rows of cages are located in the alleyway.

4. A battery cage system comprising a plurality of pairs of upright frames as claimed in claim 2, spaced transversely apart to define a service passage between each pair, the troughs of adjacent frames being fillable from said service passage.

5. A battery cage unit as claimed in claim 1, in which a series of vertically spaced longitudinal tracks is provided on each pair of frames, each cage compartment being adapted for location on the respective tracks.

6. A battery cage system as claimed in claim 1 in which the frames include upright members which form an integral part of a poultry house to support the roof of said house.

7. A battery cage system as claimed in claim 6 in which cladding is fixed to the outermost frames to form side walls of the poultry house.

References Cited

UNITED STATES PATENTS

| | | | |
|---|---|---|---|
| 2,718,872 | 9/1955 | Essary | 119—18 |
| 3,214,030 | 10/1965 | Graham | 119—18 X |
| 3,225,741 | 12/1965 | Ernst | 119—48 |
| 2,257,734 | 10/1941 | Cornell | 119—22 |
| 2,969,040 | 1/1961 | Siptrott | 119—21 |
| 2,997,021 | 8/1961 | Bailey | 119—37 |
| 3,018,759 | 1/1962 | Helbig | 119—21 |
| 3,125,068 | 3/1964 | Hampton | 119—17 |
| 3,192,901 | 7/1965 | Wolff | 119—17 |
| 3,195,506 | 7/1965 | Beard | 119—19 |
| 3,220,383 | 11/1965 | Bruner | 119—17 |
| 3,225,738 | 12/1965 | Palencia | 119—18 X |
| 3,244,359 | 4/1966 | Holland | 119—15 X |
| 3,279,432 | 10/1966 | Forstmaier et al. | 119—15 |

ALDRICH F. MEDBERY, Primary Examiner

U.S. Cl. X.R.

119—19